United States Patent

Chen et al.

[11] Patent Number: 6,109,096
[45] Date of Patent: *Aug. 29, 2000

[54] METHODS AND APPARATUS FOR MONITORING WATER PROCESS EQUIPMENT

[75] Inventors: Haiwen Chen, Holland, Pa.; Ke Hong, Kendall Park, N.J.

[73] Assignee: BetzDearborn Inc., Trevose, Pa.

[*] Notice: This patent is subject to a terminal disclaimer.

[21] Appl. No.: 08/938,419

[22] Filed: Sep. 26, 1997

Related U.S. Application Data

[63] Continuation-in-part of application No. 08/800,110, Feb. 13, 1997, Pat. No. 5,756,880.

[51] Int. Cl.[7] .................................................. G01M 3/08
[52] U.S. Cl. .................................................................. 73/40
[58] Field of Search .............................. 237/8 R; 60/667; 122/382; 73/40.5 R, 53.03, 452, 40

[56] References Cited

U.S. PATENT DOCUMENTS

| | | | |
|---|---|---|---|
| 3,447,895 | 6/1969 | Nelson et al. | 23/48 |
| 3,994,174 | 11/1976 | Ekman | 73/452 |
| 4,428,328 | 1/1984 | Ratliff | 122/396 |
| 4,462,319 | 7/1984 | Larsen | 110/238 |
| 4,497,283 | 2/1985 | LaSpisa et al. | 122/451.1 |
| 4,498,333 | 2/1985 | Parthasarathy | 73/40.5 A |
| 4,502,322 | 3/1985 | Tero | 73/40.5 A |
| 4,777,009 | 10/1988 | Singh et al. | 376/211 |
| 4,783,314 | 11/1988 | Hoots et al. | 422/3 |
| 4,963,229 | 10/1990 | Lisnyansky et al. | 162/49 |
| 4,966,711 | 10/1990 | Hoots et al. | 210/697 |
| 5,041,386 | 8/1991 | Pierce et al. | 436/50 |
| 5,148,775 | 9/1992 | Peet | 122/451 R |
| 5,304,800 | 4/1994 | Hoots et al. | 250/302 |
| 5,320,967 | 6/1994 | Avallone et al. | 436/50 |
| 5,363,693 | 11/1994 | Nevruz | 73/40.5 R |
| 5,411,889 | 5/1995 | Hoots et al. | 436/6 |
| 5,416,323 | 5/1995 | Hoots et al. | 250/305 |
| 5,565,619 | 10/1996 | Thungstrom et al. | 73/40.7 |

OTHER PUBLICATIONS

"Black Liquor Recovery Boiler Advisory Committee Recommended Emergency Shutdown Procedure (ESP) and Procedure for Testing ESP System for Black Liquor Recovery Boilers", BLRBAC, Oct. 1993.

Buckner et al., "Design and Implementation of a Commerical Acoustic Leak–Detection System for Black Liquor Recovery Boilers", TAPPI Journal, 121, Jul., 1990.

Boyette et al., "An Automated Coordinated Phosphate/pH Controller for Industrial Boilers", Presented at NACE Corrosion '95, Mar., 1995.

Durham et al., "Black Liquor Recovery Boiler Leak Detection: Indication of Boiler Water Loss Using a Waterside Mass Balance Method", Presented at TAPPI '95, in Sep, 1995.

Clevett, K. J., Process Analyzer Technology, John Wiley & Sons, New York, 1986, 872–876.

Grace, T. M., "Acoustic Leak Detection—One Answer to a Need", PIMA, 53, Dec., 1988.

Racine et al., "An Expert System for Detecting Leaks in Recovery—Boiler Tubes", TAPPI Journal, 147, Jun., 1992.

*Primary Examiner*—Hezron Williams
*Assistant Examiner*—Jay L. Politzer
*Attorney, Agent, or Firm*—Philip H. Von Neida

[57] ABSTRACT

Methods and apparatus are provided for detection of leaks in boilers containing a temperature control liquid which is supplemented with feedwater and removed as blowdown, main steam and sootblower steam. In a preferred embodiment, the boiler has an automatic liquid level control mechanism. The methods include measuring rates associated with feedwater supplementation and removal, determining the relationship between water input rate and water output rate; determining the change of mass of the temperature control liquid, determining the unaccounted for water rate, and comparing the unaccounted for water rate with zero to determine if a leak condition is present.

11 Claims, 1 Drawing Sheet

METHODS AND APPARATUS FOR MONITORING WATER PROCESS EQUIPMENT

This application is a continuation-in-part of Ser. No. 08/800,110, filed Feb. 13, 1997 U.S. Pat. No. 5,756,880.

FIELD OF THE INVENTION

The present invention is directed to methods and apparatus for monitoring industrial water process equipment. More particularly, the invention is directed to the detection of leaks in water process equipment such as black liquor recover boilers.

BACKGROUND OF THE INVENTION

A boiler is an apparatus in which water or some other aqueous temperature control liquid to which makeup water is added and from which blowdown is removed is vaporized into steam by the application of heat from a furnace or heat-generating process system. In most instances, the temperature control liquid is brought into close, indirect contact with the process system to facilitate heat transfer. Leakage in a boiler can result not only in contamination and fouling of the temperature control liquid and the process system, but also in undesired physical reactions. This is particularly true for the black liquor recovery boilers used in many paper mills. In black liquor recovery boilers, the escape or leakage of aqueous temperature control liquid from the so-called "water side" of the boiler into the hot, highly caustic "fire side" can result in violent explosions.

The prior art provides numerous techniques for monitoring and controlling leaks in black liquor recovery boilers and other boiler systems. For example, U.S. Pat. No. 5,320,967 (Avallone, et al.) discloses a boiler system leak detection method that involves introducing an inert tracer to the boiler in a known and uniform proportion to the feedwater, sensing a characteristic of the tracer in the boiler at steady state, converting the sensed characteristic to a value equivalent to the concentration of the tracer in the temperature control liquid, and activating a signal when there is excessive variance in the concentration of the tracer. However, the method disclosed by Avallone, et al. is limited by its requirement that the tracer be detected (sensed) when the boiler is at steady state, which is said to occur only when there is no significant change in any of five process parameters: the concentration of the tracer in the boiler; the blowdown rate; the feedwater rate; the rate of feeding tracer to the boiler; and the steaming rate in the absence of boiler leakage.

Further limitations include the costs of tracer chemicals and measuring equipment for both inputting tracer chemicals and for analyzing blowdown.

U.S. Pat. No. 5,363,693, Nevruz, teaches methods and apparatus for detecting leakage from chemical recovery boiler systems. The methods utilize measuring the mass input and output of a recovery boiler and calculating the long and short term statistics for the drum balance of mass flow. From these calculations a t-test function is calculated to see if both long term and short term moving average of drum balances are significantly different, which in turn indicates whether a boiler leak is occurring. Although this method provides corrections to sensor input caused by flow sensor drift and offset, it still suffers from serious offsets in the leak detection signal during changes in process parameters, namely steaming rate changes.

Consequently, there remains a need in the art for more flexible leak detection methods which can be employed in boiler systems that are not at steady state, that is, where one or more process parameters is subject to change.

SUMMARY OF THE INVENTION

The present invention provides for methods and apparatus for the detection of leaks in boilers to which a temperature control liquid is added and from which liquid is removed. In a preferred embodiment, the temperature control liquid is supplemented with feedwater and this rate of supplementation is measured. The temperature control liquid is also removed as blowdown, main steam and sootblower steam, and these rates of removal are also measured. The relationship between the water input rate and the water input rate is determined based upon the rates of supplementation and removal.

The change of mass of the temperature control liquid in the boiler can then be calculated from the measurements relating to supplementation. From this calculation, the unaccounted for water rate can be determined utilizing the known quantities of supplementation and removal and their relationship and the calculated change of mass of liquid in the boiler. A comparison of this derived amount with zero (i.e. the unaccounted for water rate is greater than 0) indicates that a leak condition is present in the boiler.

BRIEF DESCRIPTION OF THE DRAWINGS

The accompanying

DETAILED DESCRIPTION OF THE INVENTION

Figure 1:
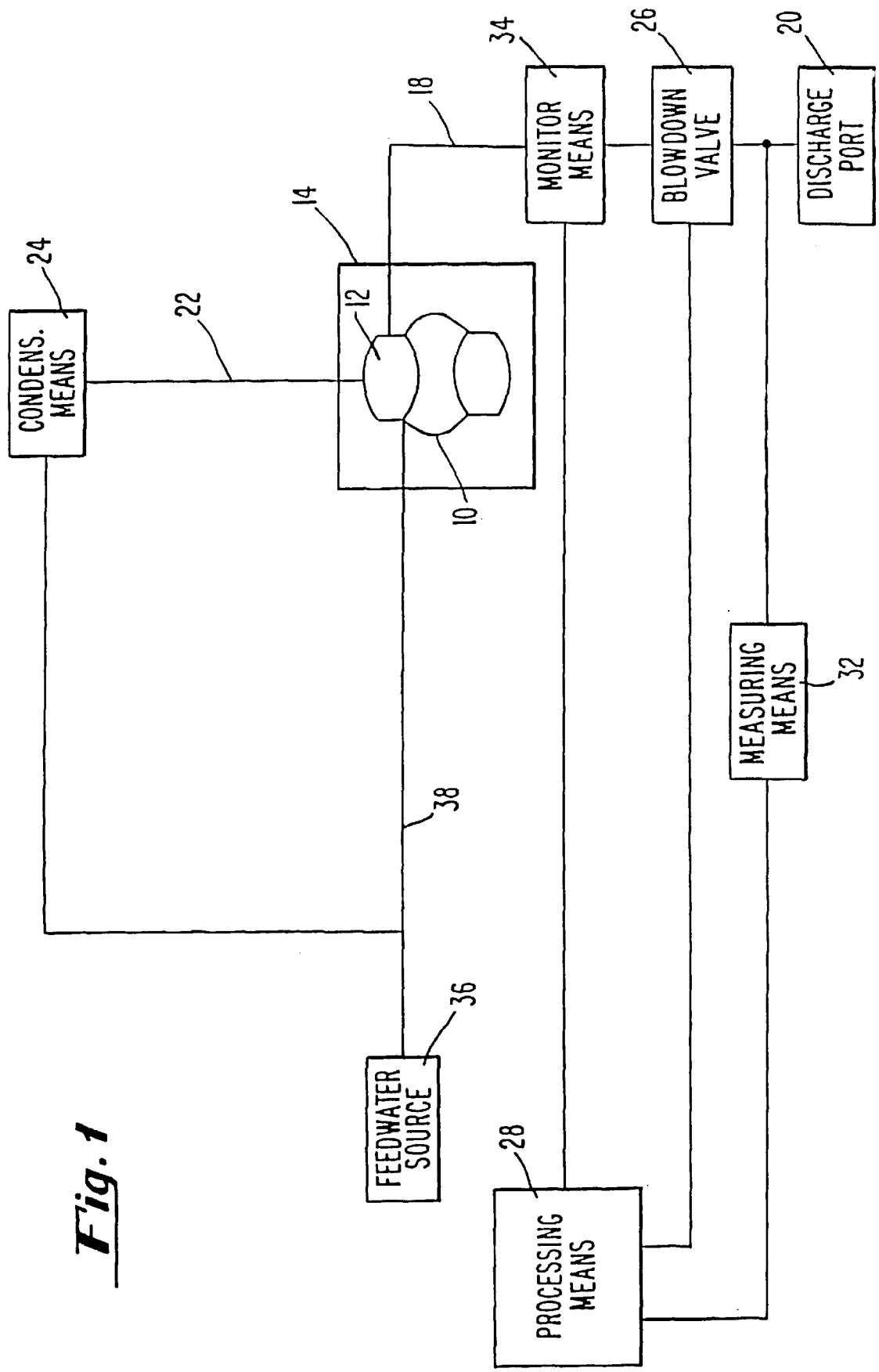
FIG. 1 is a schematic representation of a boiler monitoring system according to the invention.

The present invention provides for methods and apparatus for detecting a leak in a boiler having an automatic liquid level control mechanism in which a temperature control liquid in a containment means is supplemented with feedwater and is removed as blowdown, main steam, and sootblower steam comprising the steps of:

a) measuring a rate associated with said feedwater supplementation to obtain data;

b) measuring a rate associated with said blowdown, main steam, and sootblower steam removal to obtain data;

c) determining the relationship between the water input rate and the water output rate from the data obtained in steps (a) and (b);

d) determining the change of mass of said temperature control liquid present in said containment means from the data obtained in step (a);

e) determining the unaccounted for water rate from the data obtained in steps (a) and (b), the determination of the relationship obtained in step (c) and the determination of change of mass in step (d);

f) comparing said unaccounted for water rate with zero;

g) indicating a leak condition if said unaccounted for water rate is greater than zero.

The present invention also provides an apparatus suitable for indicating leaks in boilers. Apparatus according to the invention comprise: measuring means in communication with feedwater supplementation means; measuring means in contact with blowdown, sootblower steam and main steam removal means; determination means for the relationship between the water input rate and the water output rate based upon the rates of supplementation and removal; derivation means in communication with the measuring means for deriving the change of mass of the temperature control liquid; and derivation means in communication with the measuring means for deriving the unaccounted for water rate; and comparison means to determine if a leak condition exists.

The methods and apparatus of the present invention can be used to monitor virtually any type of equipment to which liquid is added and from which liquid is removed and uses an automatic water level control mechanism. The methods and apparatus of the invention preferably are used to monitor and detect leaks in boilers, especially black liquor recovery boilers. Representative boilers are disclosed by U.S. Pat. No. 3,447,895, Nelson et al.; U.S. Pat. No. 4,462,319, Larson; U.S. Pat. No. 4,498,333, Parthasarathy; and U.S. Pat. No. 4,502,322, Tero, the contents of which are incorporated herein by reference.

An exemplary monitoring system according to the invention is shown in FIG. 1, wherein a first "water side" containment means a "boiler" 10 containing temperature control liquid 12 is adjacent to and in thermal communication with a second "fire side" containment means 14 that typically contains hot vapors and a molten smelt bed. Boiler 10 is in fluid communication with blowdown line 18 for the discharge of blowdown to discharge port 20 and with steam line 22 for the discharge of steam to condensation means 24. The discharge of blowdown is controlled through actuation of blowdown value 26, which can be operated manually or under the control of an external computer or some other processing means (not shown). It is not necessary that the blowdown valve be under control of or monitored by the system of the invention. Between boiler 10 and valve 26, blowdown line 18 is in fluid communication with monitoring means 34 to provide information on the blowdown flow rate. Measuring means 32 and 34, in turn, are in electrical communication with processing means 28. Boiler 10 is also in fluid communication with feedwater source 36 via feed line 38.

During normal operation, the controlled addition of feedwater to boiler 10 compensates for the removal of blowdown and steam, and maintains a desired volume of temperature control liquid 12 within boiler 10. A natural consequence of steam generation in a boiler is a concentrating of incoming, non-volatile components. To control this "cycling up" effect, one or more volumes of the relatively-concentrated temperature control liquid typically are removed from the boiler as blowdown and corresponding volumes of relatively-dilute feedwater is added. In accordance with the present invention, the blowdown is measured at regular or irregular intervals or is continuously monitored to determine the weight of water removed as blowdown.

The methods of the present invention are particularly effective for those containment means having an automatic water level control mechanism. These mechanisms are found in boilers and function by way of sensing a change in the amount of volume of water present in the boiler. As water exits the boiler, the sensor indicates that the water level has dropped and signals such so that it may be automatically replenished.

In boiler systems having an automatic water level control mechanism, coefficients a, b and c can be calculated using a least squares fit on historical boiler data. This "historical" data can be that gathered for roughly one month prior to applying the methods and apparatus of the present invention. The least squares fitting is a widely used mechanism for extracting meaning from a set of related observations. In the instance of a boiler, a, b and c can be calculated from an observation and gathering of liquid flow data into and out of the boiler using a least squares fit mechanism. This gathering of data also fits with the steps of the present invention as to the various rates measured. The coefficients a, b and c is particular to each boiler and will even vary from different boilers of the same model and manufacture.

The fundamental equation for water mass balance in a containment means, such as a boiler, is:

$$\frac{dM}{dt} = I - O - U \tag{1}$$

where:
M=Water mass contained
I=Water input rate (as feedwater)
O=Water output rate (as blowdown, main steam and sootblower stem)
U=Unaccounted water rate (as leak)
t=Time In an ideal situation, if water mass contained is not changed and there is no unaccounted water rate (dM/dt and U both equal zero), then the water input rate should equal the water output rate (I=O). However, due to calibration mismatch between meters, the relationship between I and O is generally in the form of $$I = a \times O + c \tag{2}$$

where a and c are determinable constants or boiler dependent parameters. The importance of a and c is to correct the calibration mismatch while avoiding having to perform traditional correction techniques. Instead of calibrating each individual meter periodically, the easier task of recalculating a and c need only be performed.

Incorporating these terms into the calculation, the water mass balance equation is $$\frac{dM}{dt} = I - a \times O - c - U \tag{3}$$

Since I and O are measurable, to calculate U, dM/dt must be calculated. In boiler systems having an automatic water level control mechanism, by observation, dM/dt is proportional to dI/dt, or $$dM/dt = b \times dI/dt \tag{4}$$

where b is a determinable constant, like a and c, which can be calculated using a least square fit on historical boiler data, for example, one month's worth of data. The importance of the b term in computing dM/dt is in eliminating the time lag between the input (I) and the output (O).

Combining equations (3) and (4) yields the following relationships:

$$U = I - a \times O - b \times \frac{dI}{dt} - c \tag{5}$$

If the unaccounted water rate (U) is greater than zero (within a statistically-significant variance), a leak condition is indicated. Thus if U is a positive number, then the boiler operator initiates an investigation into the possible causes. This typically involves physical and/or acoustical examination of the boiler and, depending on the magnitude of the variance, complete shutdown of the boiler.

EXAMPLES

Data was gathered at a northeastern industrial boiler over a 50 hour period. During this period, feed water rate, steam rate and blowdown were measured.

Using a least squares fitting of the historical data gathered before this 50-hour period, the steam load swing parameter, b, and the parameters for corrections for flowmeter calibration mismatch, a and c, were calculated. These values were: a=0.89, b=−4, and c=−2.

When employing equation (1), the severe load swing of this boiler made it appear that at the time of the load swing that a leak was present. However, after the load swing, the use of equation (1) indicated that the is leak had disappeared. Application of the above detailed methods with the calculated boiler-dependent parameters, a, b and c, indicated no leak was present. The methods of the present invention provided greater accuracy than the traditional approach.

While this invention has been described with respect to particular embodiments thereof, it is apparent that numerous other forms and modification of this invention will be obvious to those skilled in the art. The appended claims and this invention generally should be construed to cover all such obvious forms and modifications which are within the true spirit and scope of the present invention.

Having thus described the invention, what we claim is:

1. A method for detecting a leak in a boiler having an automatic liquid level control mechanism in which a temperature control liquid in a containment means is supplemented with feedwater and is removed as blowdown, main steam and sootblower steam comprising the steps of:
    a) measuring a rate associated with said feedwater supplementation to obtain data;
    b) measuring a rate associated with said blowdown, main steam, and sootblower steam removal to obtain data;
    c) determining the relationship between the water input rate and the water output rate from the data obtained in steps (a) and (b);
    d) determining the change of mass of said temperature control liquid present in said containment means from the data obtained in step (a);
    e) determining the unaccounted for water rate from the data obtained in steps (a) and (b), the determination of the relationship obtained in step (c) and the determination of change of mass in step (d);
    f) comparing said unaccounted for water rate with zero; and
    g) indicating a leak condition if said unaccounted for water rate is greater than zero.

2. The method as claimed in claim 1 wherein said rate in steps (a) and (b) is in weight per time unit.

3. The method as claimed in claim 1 wherein said boiler is a black liquor recovery boiler.

4. The method as claimed in claim 1 wherein said leak condition is indicated by electronic means.

5. The method as claimed in claim 1 wherein said measurements in steps (a) and (b) are by flow meters.

6. The method as claimed in claim 1 wherein said determinations in steps (c), (d) and (e) are made by a computer.

7. The method as claimed in claim 1 wherein the relationship of the change of mass, input rate, output rate and unaccounted for water rate is derived according to the formula:

$$\frac{dM}{dt} = I - a \times O - c - U$$

where:
    M=water mass contained;
    I=water input rate;
    O=water output rate;
    U=unaccounted for water rate;
    t=time;
    a=a determinable constant; and
    c=a determinable constant
where a and c are calculated using a least squares fit of historical data of said boiler.

8. The method as claimed in claim 1 wherein the relationship between M and I is derived according to the formula:

$$\frac{dM}{dt} = b \times \frac{dI}{dt}$$

where:
    M=water mass contained;
    I=water input rate; and
    b=a determinable constant
where b is calculated using a least squares fit of historical data of said boiler.

9. The method as claimed in claim 1 wherein the determination of the unaccounted for water rate is derived according to the formula:

$$U = I - a \times O - b \times \frac{dI}{dt} - c$$

where:
    U=unaccounted for water rate;
    I=water input rate;
    a=a determinable constant;
    O=water output rate;
    b=a determinable constant;
    $dI/dt$=the change in water input rate over time; and
    c=a determinable constant.

10. The method as claimed in claim 1 wherein comparing said derived unaccounted for water rate is compared to zero.

11. The method as claimed in claim 10 further comprising physically analyzing said boiler in response to a positive difference between said unaccounted for water rate and zero.

* * * * *